United States Patent [19]

Miyaguchi et al.

[11] 4,268,427

[45] May 19, 1981

[54] PROCESS FOR PRODUCING NOVEL MODIFIED RESIN

[75] Inventors: Akinori Miyaguchi, Yokohama; Yasuomi Morita, Samukawa; Yasuyoshi Chino, Yokohama, all of Japan

[73] Assignees: Nippon Zeon Co. Ltd.; Morimura Chemetron Ltd., both of Tokyo, Japan

[21] Appl. No.: 81,199

[22] Filed: Oct. 2, 1979

[30] Foreign Application Priority Data

Oct. 6, 1978 [JP] Japan ................................. 53-123229

[51] Int. Cl.$^3$ ..................... C09D 3/727; C09D 3/733; C09D 11/10
[52] U.S. Cl. .................................. 260/23.7 C; 106/20; 106/27; 106/28; 260/DIG. 38; 526/283
[58] Field of Search ................. 260/23.7 C, DIG. 38; 106/20, 27, 28; 526/283

[56] References Cited

U.S. PATENT DOCUMENTS

| | | | |
|---|---|---|---|
| 3,084,147 | 4/1963 | Wilks | 260/23 XA |
| 3,937,674 | 2/1976 | Laarkamp | 260/23.7 C |
| 4,037,038 | 7/1977 | Tsuchiya | 526/283 |
| 4,064,199 | 12/1977 | Nishikawa | 526/283 |
| 4,183,833 | 1/1980 | Miyaguchi et al. | 260/23.7 C |

*Primary Examiner*—Ronald W. Griffin
*Attorney, Agent, or Firm*—Sherman & Shalloway

[57] ABSTRACT

A process for producing a novel modified resin, which comprises reacting (I) the reaction product of 98 to 35% by weight of a cyclopentadiene resin, 2 to 65% by weight of a higher fatty acid ester having a conjugated double bond and 0 to 30% by weight of an $\alpha,\beta$-unsaturated dicarboxylic acid anhydride, with (II) at least one vinyl monomer selected from the group consisting of vinyl aromatic compounds and unsaturated monocarboxylic acid esters; and a vehicle component composition for printing inks comprising the aforesaid modified resin.

14 Claims, No Drawings

PROCESS FOR PRODUCING NOVEL MODIFIED RESIN

This invention relates to a novel modified resin suitable as a vehicle component of a printing ink, a process for producing the modified resin, and a printing ink composition containing it as a vehicle component. More specifically, this invention relates to a novel modified resin derived from a cyclopentadiene resin, a higher fatty acid ester, a vinyl monomer and optionally an $\alpha,\beta$-unsaturated dicarboxylic acid anhydride, a process for producing said modified resin, and to a printing ink composition containing the modified resin as a vehicle component.

Various methods have been known in the past for the modification of cyclopentadiene resins. They include, for example, a method which comprises cooking a cyclopentadiene resin and a natural drying oil (U.S. Pat. No. 3,084,147), and a method which comprises reacting a cyclopentadiene resin with a higher unsaturated fatty acid in the presence of a metal compound (Japanese Patent Publication No. 2633/75). However, modified resins obtained by these methods do not have entirely satisfactory drying properties required of a vehicle component for a fast drying printing ink, and inks prepared by using these modified resins are not satisfactory in regard to the strength and gloss of coated films.

It is a main object of this invention to provide a modified resin suitable as a vehicle component of a printing ink having a fast drying property, a process for producing this modified resin, and a printing ink composition containing the modified resin as a vehicle component.

Another object of this invention is to provide a modified resin from which an ink having superior film properties such as strength and gloss can be prepared, a process for producing said modified resin, and a printing ink composition containing said modified resin as a vehicle component.

It has been found that these objects can be achieved by reacting the reaction product between a cyclopentadiene resin and a specified drying oil, with a specified vinyl monomer.

According to this invention, there is provided a process for producing a novel modified resin, which comprises reacting (I) the reaction product of 98 to 35% by weight of a cyclopentadiene resin, 2 to 65% by weight of a higher fatty acid ester having a conjugated double bond and 0 to 30% by weight of an $\alpha,\beta$-unsaturated dicarboxylic acid anhydride, with (II) at least one vinyl monomer selected from the group consisting of vinyl aromatic compounds and unsaturated monocarboxylic acid esters.

The reaction product (I) used in this invention is the reaction product derived from 98 to 35% by weight, preferably 95 to 50% by weight, of the cyclopentadiene resin, 2 to 65% by weight, preferably 5 to 50% by weight, of the higher fatty acid ester having a conjugated double bond, and 0 to 30% by weight, preferably 0.3 to 15% by weight, of the $\alpha,\beta$-unsaturated dicarboxylic acid anhydride. If the amount of the higher fatty acid ester is less than 2% by weight, the resulting product has poor wettability with pigments and poor reactivity with the vinyl monomer (II). If it exceeds 65% by weight, gellation tends to take place during the reaction. The use of the $\alpha,\beta$-unsaturated dicarboxylic acid anhydride brings about a further improvement in the wettability of the product with pigments and serves to inhibit the formation of a gel. However, if it is used in an amount of more than 30% by weight, the product has a bad color, and an ink prepared from it tends to cause plate smudging.

The cyclopentadiene resin used in this invention is obtained in a customary manner by heat-polymerizing a cyclopentadiene monomer such as cyclopentadiene, methylcyclopentadiene or dimers, trimers or codimers thereof, or a mixture of the cyclopentadiene monomer with a minor amount of a comonomer copolymerizable therewith. Cyclopentadiene resins having a softening point of 80° to 200° C., especially 100° to 170° C., and a Gardner color number of not more than 12 are suitable.

Specific examples of the comonomer are monolefins such as ethylene, propylene, butene and styrene; conjugated dienes such as 1,3-butadiene, isoprene and 1,3-pentadiene; and polar vinyl monomers such as vinyl acetate, acrylic esters, methacrylic esters, acrylonitrile and allyl alcohol. Homopolymers of cyclopentadiene monomers or copolymers of these with hydrocarbon-type comonomers such as monolefins and conjugated dienes are preferred.

Examples of the higher fatty acid ester are esters formed between monocarboxylic acids having a conjugated double bond in the molecular chain and having at least 12 carbon atoms, such as eleostearic acid and parinaric acid, and monohydric or polyhydric alcohols such as methanol, ethanol, butanol, octanol, ethylene glycol, glycerol, pentaerythritol and trimethylol propane. Of these, triesters of glycerol are preferred. The triglycerides are contained in natural drying oils such as tung oil, dehydrated castor oil, oiticica oil and perilla oil. In the present invention, these natural drying oils are suitable as a source of the higher fatty acid ester.

Specific examples of the $\alpha,\beta$-unsaturated dicarboxylic acid anhydride include maleic anhydride, citraconic anhydride, itaconic anhydride, and alkyl-substituted derivatives of these. Maleic anhydride is preferred in view of its reactivity, quality and cost. When $\alpha,\beta$-unsaturated dicarboxylic acids are used, modified resins suitable as an ink vehicle component cannot be obtained.

In the synthesis of the reaction product (I), two or three required ingredients may be reacted as desired, and no particular limitation is imposed on the sequence of reactions. However, to prevent gellation and obtain a high-molecular-weight reaction product, it is preferred first to prepare an adduct of the cyclopentadiene resin with the $\alpha,\beta$-unsaturated dicarboxylic acid anhydride and an adduct of the higher fatty acid ester with the $\alpha,\beta$-unsaturated dicarboxylic acid anhydride, and then react these two adducts. When the cyclopentadiene resin is reacted directly with the higher fatty acid ester without first forming such adducts, gellation of the higher fatty acid ester tends to take place. Hence, in this case, utmost care is required in controlling the reaction.

The reaction of these components is carried out usually at 190° to 300° C. for 30 minutes to 8 hours in an atmosphere of a gas which is inert to the reaction, such as nitrogen or argon. When the reaction product (I) is to be prepared from the aforesaid adducts of the cyclopentadiene resin and the higher fatty acid ester, these adducts may be prepared by separately reacting the cyclopentadiene resin with the $\alpha,\beta$-unsaturated dicarboxylic acid anhydride, and the higher fatty acid ester with the $\alpha,\beta$-unsaturated dicarboxylic acid anhydride, in a customary manner, for example at 150° to 250° C. for 10 minutes to 5 hours; or by simultaneously reacting the cyclopentadiene resin, the higher fatty acid ester and the α,β-unsaturated dicarboxylic acid anhydride to form these adducts in situ.

The amount of the α,β-unsaturated dicarboxylic acid anhydride used at this time is preferably at least 0.1 part by weight, usually 0.2 to 50 parts by weight, per 100 parts by weight of each of these components in order to increase the reactivity of the cyclopentadiene resin with the higher fatty acid ester. To obtain a modified resin useful as an ink vehicle component, it is suitable to use the α,β-unsaturated dicarboxylic acid anhydride in an amount of 0.3 to 15 parts by weight, preferably 0.5 to 10 parts by weight, per 100 parts by weight of each of the cyclopentadiene resin and the higher fatty acid ester.

The reaction is carried out usually in the absence of a diluent. If desired, a diluent may be used. Examples of the diluent are ordinary hydrocarbon solvents such as benzene, toluene, xylene, tetralin and mineral oils, and natural oils inert to the reaction, such as linseed oil and soybean oil. As required, a compound of a metal such as titanium, zirconium, tin or lead may be used as a catalyst.

According to the process of this invention, the reaction product (I) so obtained is reacted with (II) at least one vinyl monomer selected from the group consisting of vinyl aromatic compounds and unsaturated monocarboxylic acid esters to afford a modified resin.

Examples of the vinyl aromatic compounds are styrene, α-methylstyrene, vinyltoluene and divinylbenzene. Examples of the unsaturated monocarboxylic acid esters include esters formed between unsaturated monocarboxylic acids such as acrylic acid and methacrylic acid and monohydric or polyhydric alocohols such as methanol, ethanol, propanol, butanol, hexanol, octanol, ethylene glycol, propylene glycol, butanediol, hexanediol, glycerol, pentaerythritol and trimethylolpropane. Use of such vinyl monomers as vinyl acetate and vinyl propionate is undesirable because the resulting product is inferior in regard to solubility in ink solvents and wettability with pigments.

The reaction between the reaction product (I) and the vinyl monomer (II) is carried out in the presence of a radical initiator usually at 80° to 280° C. for 10 minutes to 5 hours. The radical initiator used may be any compound which generates radicals upon heating, and includes, for example, benzoyl peroxide, lauroyl peroxide, tert.butyl peroxide, cumene hydroperoxide, tert.butyl perbenzoate and azobisisobutyronitrile. The radical initiator is used usually in an amount of 0.001 to 0.5 mole per mole of the vinyl monomer. A diluent may be used in this reaction. The diluent may be compounds of the same group as described above with regard to the synthesis of the reaction product (I).

The amount of the vinyl monomer used can be varied over a wide range, but is usually 0.1 to 80 parts by weight, preferably 0.5 to 60 parts by weight, per 100 parts by weight of the reaction product (I). Reaction of the reaction product (I) with the vinyl monomer (II) gives a modified resin from which an ink having a markedly improved drying property and excellent film properties such as strength and gloss can be prepared.

Japanese Laid-Open Patent Publication No. 125494/78 discloses that the reaction product obtained by reacting an adduct between a cyclopentadiene resin and an α,β-unsaturated dicarboxylic acid anhydride with an adduct between a higher fatty acid ester and an α,β-unsaturated dicarboxylic acid anhydride has better wettability with pigments, higher solubility in ink solvents, and better compatibility with other ink vehicle components than conventional cyclopentadiene resins. When such a reaction product is used in this invention as the reaction product (I), a modified resin can be obtained which further has these properties and is suitable as an ink vehicle component.

The modified resin thus obtained usually has a softening point of 40° to 180° C., and finds application in fields in which cyclopentadiene resins are generally used, for example as paints, adhesives and varnishes. It is especially suitable as an ink vehicle component, particularly a vehicle component of a fast drying offset printing ink.

The following Examples illustrate the present invention more specifically. All parts and percentages in these examples are by weight unless otherwise specified.

EXAMPLE 1

One hundred parts of a cyclopentadiene resin having a softening point of 135° and a Gardner color number of 4 and obtained by heat-polymerizing cyclopentadiene having a purity of 97% in the presence of xylene at 260° C. for 4 hours, and 50 parts of tung oil were heated at 170°0 C. to melt the resin. The molten mixture was then reacted with 4 parts of maleic anhydride at 180° C. for 1 hour. Further, 1 part of zirconium octenate was added. The temperature was raised to 240° C., and the reaction was performed at this temperature for 5 hours. After the reaction, styrene was added in each of the amounts shown in Table 1 to 100 parts of the resulting product, and 1%, based on the styrene, of benzoyl peroxide was added. The mixture was reacted at 180° C. for 1 hour to afford a modified resin.

The softening point and Gardner color number of the resulting resin were measured. Then, 40 parts of the modified resin was dissolved in 60 parts of a petroleum solvent (No. 5 Solvent, a product of Nippon Oil. Co., Ltd.), and the viscosity of the solution was determined on the Gardner scale.

One hundred parts of the modified resin and 66.7 parts of the petroleum solvent were heated with stirring at 180° C. for 20 minutes to form a dope. A pigment (Phthalocyanine Blue TGR, a product of Dainippon Ink & Chemicals, Inc.) was added so that the pigment content became 20%, and they were kneaded on a three-roll mill to form prepare an ink.

The resulting ink was spread on coated paper by an RI tester, and the drying property and film properties of the ink were determined. The results are shown in Table 1.

TABLE 1

| Run No. | Control 1-1 | Invention 1-2 | 1-3 | 1-4 | 1-5 | 1-6 |
|---|---|---|---|---|---|---|
| Amount (parts) of styrene | 0 | 1 | 5 | 10 | 30 | 60 |
| Characteristics | | | | | | |
| Softening point (°C.) | 110 | 112 | 115 | 120 | 130 | 140 |
| Gardner color number | 16 | 16 | 16 | 16 | 16 | 16 |
| Viscosity (Gardner) of the solution | R-S | S | S | S | T | T |
| Set (minutes) (*1) | 20 | 15 | 10 | 5 | 7 | 10 |

TABLE 1-continued

| Run No. | Control 1-1 | Invention 1-2 | 1-3 | 1-4 | 1-5 | 1-6 |
|---|---|---|---|---|---|---|
| Film strength (*2) | C | A | A | A | A | A |

(*1) Fine paper was superimposed on coated paper on which the ink was spread, and the assembly was pressed with a roll. The time which elapsed until set-off completely disappeared was measured.
(*2) The coated surface was rubbed through 20 cycles under a load of 2 pounds by a Southerland Rub Tester. The results were evaluated on the following scale.
A: no change is seen in the coated surface
B: no change is seen in the coated surface, but the paper wrapping the load is slightly colored
C: a slight injury is caused to the coated surface
D: the coated surface is worn away It is seen from the results that the reaction of styrene increases the viscosity of the solution and markedly improves the set and film sterength.

EXAMPLE 2

The procedure of Example 1 was repeated except that butyl acrylate was used instead of styrene. The results are shown in Table 2.

TABLE 2

| Run No. | Control 2-1 | Invention 2-2 | 2-3 | 2-4 | 2-5 | 2-6 |
|---|---|---|---|---|---|---|
| Butyl acrylate (parts) | 0 | 1 | 5 | 10 | 30 | 60 |
| Characteristics | | | | | | |
| Softening point (°C.) | 110 | 115 | 125 | 138 | 144 | 148 |
| Gardner color number | 16 | 16 | 16 | 16 | 16 | 16 |
| Viscosity (Gardner) of the solution | R-S | T | T | T | U | U |
| Set (minutes) (*1) | 20 | 14 | 11 | 4 | 5 | 10 |
| Film strength (*2) | C | B | A | A | A | A |

(*1) and (*2) Same as the footnote to Table.

The results obtained demonstrate that the use of butyl acrylate produces the same effect as that of styrene.

EXAMPLE 3

The procedure of Example 1 was repeated except that 10 parts of each of the vinyl monomers shown in Table 3 was used instead of styrene per 100 parts by weight of the reaction product (I). The results are shown in Table 3.

TABLE 3

| Run No. | Invention 3-1 | 3-2 | 3-3 |
|---|---|---|---|
| Vinyl monomer | Vinyl-toluene | Butyl methacrylate | 1,6-Hexanediol diacrylate |
| Characteristics | | | |
| Softening point (°C.) | 122 | 136 | 147 |
| Gardner color number | 16 | 16 | 16 |
| Viscosity (Gardner) of the solution | S | U | U |
| Set (minutes) (*1) | 7 | 5 | 4 |
| Film strength (*2) | A | A | A |

(*1) and (*2) Same as the footnote to Table 1.

EXAMPLE 4

One hundred parts of the same cyclopentadiene resin as used in Example 1, 50 parts of tung oil, and 4 parts of maleic anhydride were reacted at 200° C. for 2 hours. One hundred parts of the resulting product was mixed with 10 parts of each of the vinyl monomers shown in Table 4, and 1%, based on the vinyl monomer, of benzoyl peroxide, and they were reacted at 180° C. for 1 hour to form a modified resin. The modified resin was subjected to the same test as shown in Example 1. The results are shown in Table 4.

TABLE 4

| Run No. | Control 4-1 | Invention 4-2 | 4-3 |
|---|---|---|---|
| Vinyl Characteristics | — | Styrene | Butyl acrylate |
| Softening point (°C.) | 110 | 115 | 132 |
| Viscosity (Gardner) of the solution | P | S | S |
| Set (minutes) (*1) | 23 | 15 | 13 |
| Film strength (*2) | D | C | C |

(*1) and (*2) Same as the footnote to Table 1.

The results show that the drying property and film properties can be improved irrespective of the method of production of the reaction product (I).

EXAMPLE 5

The procedure of Example 4 was repeated except that maleic anhydride was omitted in forming the reaction product (I). The results are shown in Table 5.

TABLE 5

| | Control 5-1 | Invention 5-2 | 5-3 |
|---|---|---|---|
| Vinyl monomer | — | Sytrene | Butyl acrylate |
| Characteristics | | | |
| Softening point (°C.) | 108 | 121 | 130 |
| Viscosity (Gardner) of the solution | O | R | R |
| Set (minutes) (*1) | 25 | 17 | 15 |
| Film strength (*2) | D | C | C |

The results show that the drying property and film properties can be improved even when the reaction product (I) is synthesized in the absence of maleic anhydride.

COMPARATIVE EXAMPLE

When 100 parts of tung oil, 10 parts of styrene or butyl acrylate and 0.1 part of benzoyl peroxide were heated at 180° C. for 1 hour, gellation was remarkable, and no product could be obtained which would be usable as an ink vehicle component.

What we claim is:

1. A process for producing a modified resin, which comprises reacting
    (I) the reaction product of 98 to 35% by weight of a cyclopentadiene resin, 2 to 65% by weight of a higher fatty acid ester having a conjugated double bond and 0 to 30% by weight of an $\alpha,\beta$-unsaturated dicarboxylic acid anhydride, with
    (II) at least one vinyl monomer selected from the group consisting of vinyl aromatic compounds and unsaturated monocarboxylic acid esters.

2. The process of claim 1 wherein said modified resin has a softening point of 40° to 180° C.

3. The process of claim 1 wherein the proportion of the vinyl monomer (II) is 0.1 to 80 parts by weight per 100 parts by weight of the reaction product (I).

4. The process of claim 1 wherein the proportion of the vinyl monomer (II) is 0.5–60 parts by weight, per 100 parts by weight of the reaction product (I).

5. The process of claim 1 wherein said reaction product (I) is derived from 98 to 35% by weight of the cyclopentadiene resin, 2 to 65% by weight of the higher fatty acid ester, and 0.3 to 15% by weight of the α,β-unsaturated dicarboxylic acid anhydride.

6. The process of claim 1 wherein said reaction product (I) is derived from 95–50% by weight of the cyclopentadiene resin, 5–50% by weight of the higher fatty acid ester having a conjugated double bond and 0.3–15% by weight of the α,β-unsaturated dicarboxylic acid anhydride.

7. The process of claim 1 wherein said reaction product (I) is the reaction product of an adduct between the cyclopentadiene resin and the α,β-unsaturated dicarboxylic acid anhydride with an adduct between the higher fatty acid ester and the α,β-unsaturated dicarboxylic acid anhydride.

8. The process of claim 1 wherein the reaction between product (I) and the vinyl monomer (II) is carried out in the presence of a radical initiator at 80°–280° C. for 10 minutes to 5 hours.

9. The process of claim 1 wherein the vinyl monomer (II) is a vinyl aromatic compound selected from the group consisting of styrene, α-methylstyrene, vinyltoluene and divinylbenzene.

10. The process of claim 1 wherein the vinyl monomer (II) is the unsaturated monocarboxylic acid ester which is an ester of an unsaturated monocarboxylic acid selected from the group consisting of acrylic acid and methacrylic acid and an alcohol selected from the group consisting of methanol, ethanol, propanol, butanol, hexanol, octanol, ethylene glycol, propylene glycol, butanediol, hexanediol, glycerol, pentaerythritol and trimethylol propane.

11. A modified resin obtained by the process of any one of claims 2, 3, 5 or 7.

12. A modified resin obtained by the process of claim 8.

13. A vehicle component composition for printing inks, said composition comprising a modified resin having a softening point of 40° to 180° C., said modified resin being obtained by the reaction of
  (I) 100 parts by weight of the reaction product of 98 to 35% by weight of a cyclopentadiene resin, 2 to 65% by weight of a higher fatty acid ester having a conjugated double bond and 0 to 30% by weight of an α,β-unsaturated dicarboxylic acid anhydride, with
  (II) 0.1 to 80 parts by weight of at least one vinyl monomer selected from the group consisting of vinyl aromatic compounds and unsaturated monocarboxylic acid esters.

14. In an ink comprising a vehicle component, a pigment and a solvent, the improvement wherein said vehicle component is the composition of claim 13.

* * * * *